(12) United States Patent
Hammad

(10) Patent No.: US 7,668,785 B1
(45) Date of Patent: *Feb. 23, 2010

(54) NOTIFICATION SOCIAL NETWORKING

(75) Inventor: Ayman Hammad, Pleasanton, CA (US)

(73) Assignee: Visa International Service Association, San Francisco, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 12/568,065

(22) Filed: Sep. 28, 2009

(51) Int. Cl.
*G06Q 99/00* (2006.01)

(52) U.S. Cl. .............. 705/75; 705/65; 705/70; 705/78; 705/50; 705/14; 705/30; 235/379

(58) Field of Classification Search ............. 705/50–59, 705/14, 30, 64–79; 235/379
See application file for complete search history.

(56) References Cited

U.S. PATENT DOCUMENTS

| | | | |
|---|---|---|---|
| 7,389,275 B2 | 6/2008 | Kemper et al. | |
| 7,403,916 B1 * | 7/2008 | Brownell et al. | 705/33 |
| 2004/0225560 A1 * | 11/2004 | Lewis et al. | 705/14 |
| 2007/0055597 A1 | 3/2007 | Patel et al. | |
| 2008/0126251 A1 | 5/2008 | Wassingbo | |
| 2008/0154772 A1 | 6/2008 | Carlson | |
| 2008/0288384 A1 | 11/2008 | Collins et al. | |
| 2009/0099961 A1 | 4/2009 | Ogilvy | |
| 2009/0234745 A1 * | 9/2009 | Ramer et al. | 705/14.23 |

FOREIGN PATENT DOCUMENTS

GB 2452803 A 3/2009

OTHER PUBLICATIONS

Mallat, N. et al., "Mobile Bankink Services", May 2004, Communications of the ACM, vol. 47, No. 5, pp. 42-46.*
Hammad, et al., "Alerts Based System and Method," U.S. Appl. No. 61/173,371, filed Apr. 28, 2009.
Ayman Hammad, "Notification Social Networking," filed Sep. 29, 2009, U.S. Appl. No. 12/569,483.

* cited by examiner

*Primary Examiner*—Jalatee Worjloh
(74) *Attorney, Agent, or Firm*—Townsend and Townsend and Crew LLP (57) ABSTRACT

A method. The method includes a) sending a first transaction notification message comprising an original payee identifier to a user. The original payee identifier may be part of original transaction information associated with a first transaction. At some point, the user sees this transaction information and wants to correct one or more items in the transaction information. For example, the user may not recognize that the original payee identifier is wrong or is otherwise unrecognizable. The user may then contact a central server (e.g., via a Web site) and may provide updated transaction information such as an updated merchant identifier to the central server computer. This updated transaction information may be stored so that subsequent transactions can be accurately conducted and reported to the user, and other uses.

19 Claims, 8 Drawing Sheets

NOTIFICATION SOCIAL NETWORKING

CROSS-REFERENCES TO RELATED APPLICATIONS

None.

BACKGROUND

When a user conducts a purchase transaction with a credit card or a debit card, details of that transaction are forwarded to the consumer at some point in time. The consumer may be notified of the transaction in his monthly credit or debit card statement, and/or may be notified of the transaction by a transaction notification alert that is sent to the consumer's phone. The transaction notification may include a merchant identifier, the date on which the transaction occurred, and the amount of the purchase.

In some cases, the merchant identifier that is sent to the consumer is not clear and the consumer may not recognize the particular merchant identifier in the notification alert or in his monthly statement. For example, in some cases, the actual merchant that conducted the transaction may operate under a tradename that is different than the real name of the merchant. When the consumer does not recognize the name of the merchant in the transaction notification alert or in the monthly statement, the consumer may get the incorrect impression that some type of fraud is occurring. The consumer may erroneously contact the issuer to report the alleged fraud, only to learn that the transaction was legitimate and that a mistake had been made.

In other instances, the transaction information that is sent to the user may simply be incorrect. For example, the name of the merchant in the transaction notification may simply be incorrect or misspelled, due to a data error at a central server. If this information is incorrect, then the central server that provides such transaction information to the consumer and others may continue to provide incorrect information. It would be desirable if there was an efficient way to "clean" transaction data so that incorrect data in a payment processing system (or the like) is corrected in a timely manner so that subsequent transactions are conducted and reported with accuracy.

Embodiments of the invention address these and other problems, individually and collectively.

BRIEF SUMMARY

Embodiments of the invention are directed to methods, computer readable media, devices, computer apparatuses, and systems.

One embodiment of the invention is directed to a method comprising: a) sending a first transaction notification message comprising an original payee identifier to a user; b) receiving updated transaction information at a central server computer; c) storing the updated transaction information in a database; and d) sending a second transaction notification message using the updated transaction information to the user.

Another embodiment of the invention is directed to a method comprising: a) receiving a first transaction notification message, wherein the first transaction notification message comprises an original payee identifier; b) providing updated transaction information to a central server computer after receiving the first transaction notification message; and c) receiving a second transaction notification message, wherein the second transaction notification message is generated using the updated transaction information.

In a specific example, a transaction notification message with a merchant identifier (e.g., Yummy Brands Store 12345) is sent to a phone operated by a user. The merchant identifier may not be readily identifiable by the user. If this is the case, then the user may provide an updated identifier to the central server computer by contacting a Web site accessible to the central server computer. For example, a corporation such as Yummy Brands may identify a particular restaurant in a particular city as "Yummy Brands Store 12345" and this may be reflected in a transaction notification message that is sent to the user. However, when the user receives a message or an indication on his monthly statement of a charge at "Yummy Brands Store 12345," he may not recognize it. Upon learning that Yummy Brands Store 12345 operates under the tradename "Tennessee Fried Chicken" in Smalltown, Calif., the user may contact a central server that operates a central Website. On that Website, the user may enter an updated merchant identifier such as "Tennessee Fried Chicken" in Smalltown, Calif. for "Yummy Brands Store 12345." The updated merchant identifier may be more easily recognizable by the user when he receives subsequent transaction notification messages from that merchant.

The Web site can be used for other purposes as well. For example, the Web site can be used as a site for rating the particular merchant and other merchants. The merchant may see the rating information pertinent to the merchant, and could also send coupons to the user and/or may respond to user comments. In some embodiments, the ratings can be provided by users in response to alert messages that are received by the merchant.

Other embodiments of the invention are directed to computer readable media comprising computer code for implementing a method, such as the above-described methods, executed by a processor. Yet other embodiments of the invention are directed to devices and computers comprising the computer readable media.

These and other embodiments of the invention are described in further detail below.

DETAILED DESCRIPTION

One embodiment of the invention is directed to a method including a) sending a first transaction notification message comprising an original payee identifier (e.g., a merchant identifier) to a user. The original payee identifier may be part of original transaction information associated with a first transaction. At some point, the user sees this transaction information and wants to correct one or more items in the transaction information. For example, the user may not recognize that the original payee identifier is wrong or is otherwise unrecognizable. In another example, the user may simply determine that there is an error in the transaction notification information. Other types of data errors include transaction amount calculation errors, transaction type errors (e.g., the transaction is a card present transaction, but the alert message indicated that the transaction is a card not present type of transaction); the transaction was a contactless transaction when the alert message indicated that the transaction was a magnetic stripe transaction), etc. In any case, the user may then contact a central server (e.g., via a Web site) and may provide updated transaction information such as an updated merchant identifier to the central server computer. This updated transaction information may be stored so that subsequent transactions can be accurately conducted and reported to the user, and other users.

I. Exemplary Systems

Figure 1:
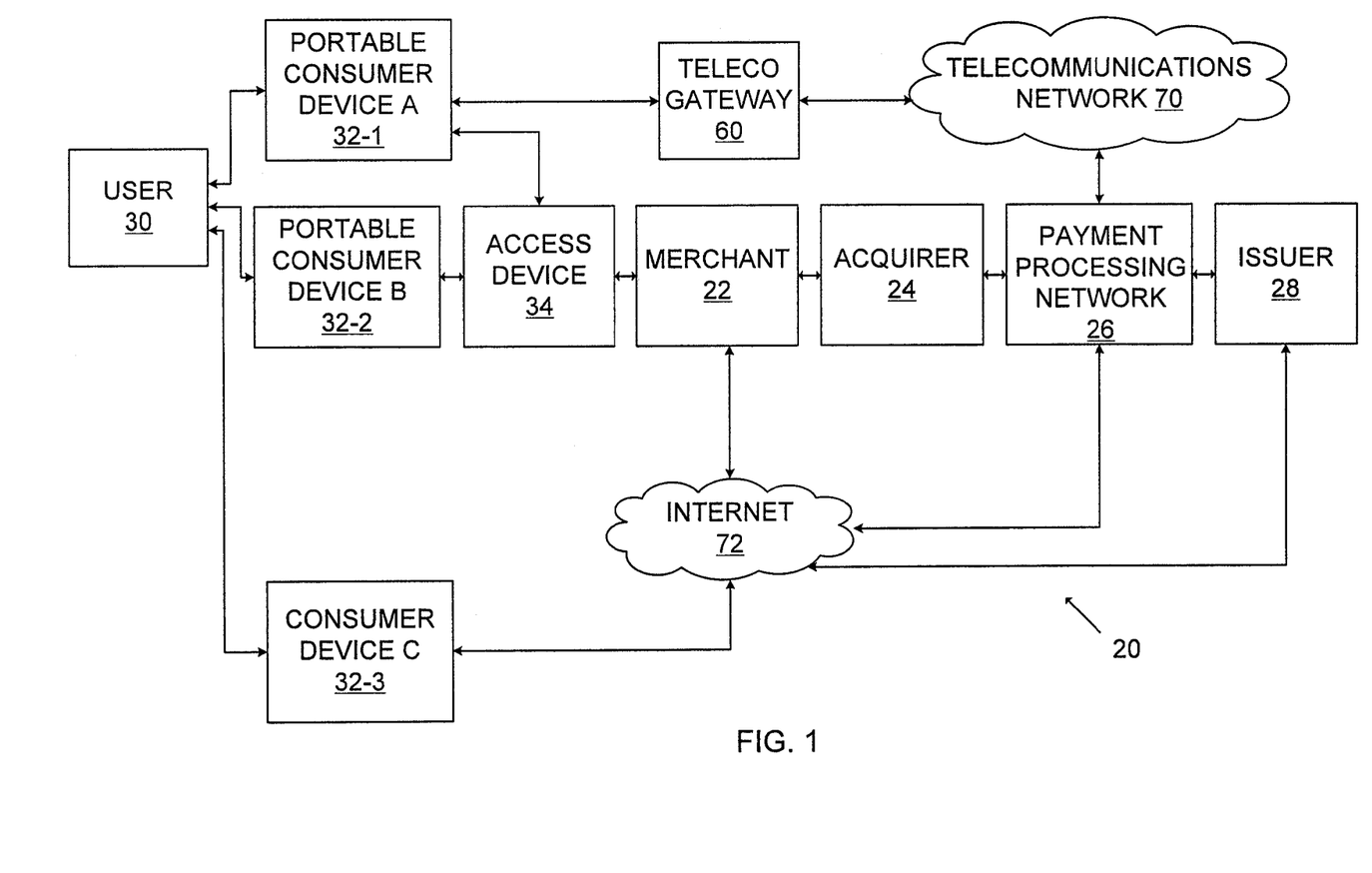
FIG. 1 shows a block diagram of a system according to an embodiment of the invention that can be used in some embodiments of the invention.

A system according to an embodiment of the invention is shown in FIG. 1.

FIG. 1 shows a system 20 that can be used in an embodiment of the invention. The system 20 includes a merchant 22 and an acquirer 24 associated with the merchant 22. In a typical payment transaction, a consumer such as user 30 may purchase goods or services at the merchant 22 using a portable consumer device such as portable consumer device B 32-2 (or portable consumer device A 32-1 or consumer device 32-3). The user 30 may be an individual, or an organization such as a business that is capable of purchasing goods or services. The acquirer 24 can communicate with an issuer 28 via a payment processing network 26.

As used herein, an "issuer" is typically a business entity (e.g., a bank) which maintains financial accounts for the user and often issues a portable consumer device such as a credit or debit card to the user. A "merchant" is typically an entity that engages in transactions and can sell goods or services. An "acquirer" is typically a business entity (e.g., a commercial bank) that has a business relationship with a particular merchant or other entity. Some entities can perform both issuer and acquirer functions. Embodiments of the invention encompass such single entity issuer-acquirers.

In FIG. 1, user 30 can use at least two different types of portable consumer devices including consumer device A 32-1 and portable consumer device B 32-2. In one example, consumer device A 32-1 may be in the form of a phone, while portable consumer device B 32-2 may be in the form of a card. The consumer device A 32-1 may consequently be used to communicate with the issuer 28 via a telecommunications gateway 60, a telecommunications network 70, and a payment processing network 26. The different consumer devices A 32-1 and B 32-2 could be linked to the same issuer account number, or could be linked to respectively different issuer account numbers. User 30 may also use a consumer device 32-3 such as a personal computer to communicate with the payment processing network 26 and/or the merchant 22 via the Internet 72.

The consumer devices according to embodiments of the invention may be in any suitable form. In some embodiments, the consumer devices are portable in nature and may be portable consumer devices. Suitable portable consumer devices can be hand-held and compact so that they can fit into a user's wallet and/or pocket (e.g., pocket-sized). They may include smart cards, ordinary credit or debit cards (with a magnetic strip and without a microprocessor), keychain devices (such as the Speedpass™ commercially available from Exxon-Mobil Corp.), etc. Other examples of portable consumer devices include cellular phones, personal digital assistants (PDAs), pagers, payment cards, security cards, access cards, smart media, transponders, and the like. The portable consumer devices can also be debit devices (e.g., a debit card), credit devices (e.g., a credit card), or stored value devices (e.g., a stored value card).

Each consumer device may comprise a body, and a memory comprising a computer readable medium disposed on or within the body. In addition, the consumer device may also include a processor coupled to the memory, where greater functionality and/or security are desired. If the consumer device is capable of receiving data, it may include a computer readable medium comprising code for causing a processor to execute a method comprising a) receiving a first transaction notification message, wherein the first transaction notification message comprising transaction information comprising an original payee identifier; b) providing updated transaction information to a central server computer after receiving the first transaction notification message; and c) receiving a second transaction notification message, wherein the second transaction notification message is generated using the updated transaction information. The computer readable medium may also comprise e) code for receiving an offer with the updated payee identifier.

The payment processing network 26 may include data processing subsystems, networks, and operations used to support and deliver authorization services, exception file services, and clearing and settlement services. An exemplary payment processing network may include VisaNet™. Payment processing networks such as VisaNet™ are able to process credit card transactions, debit card transactions, and other types of commercial transactions. VisaNet™, in particular, includes a VIP system (Visa Integrated Payments system) which processes authorization requests and a Base II system which performs clearing and settlement services.

Figure 2:
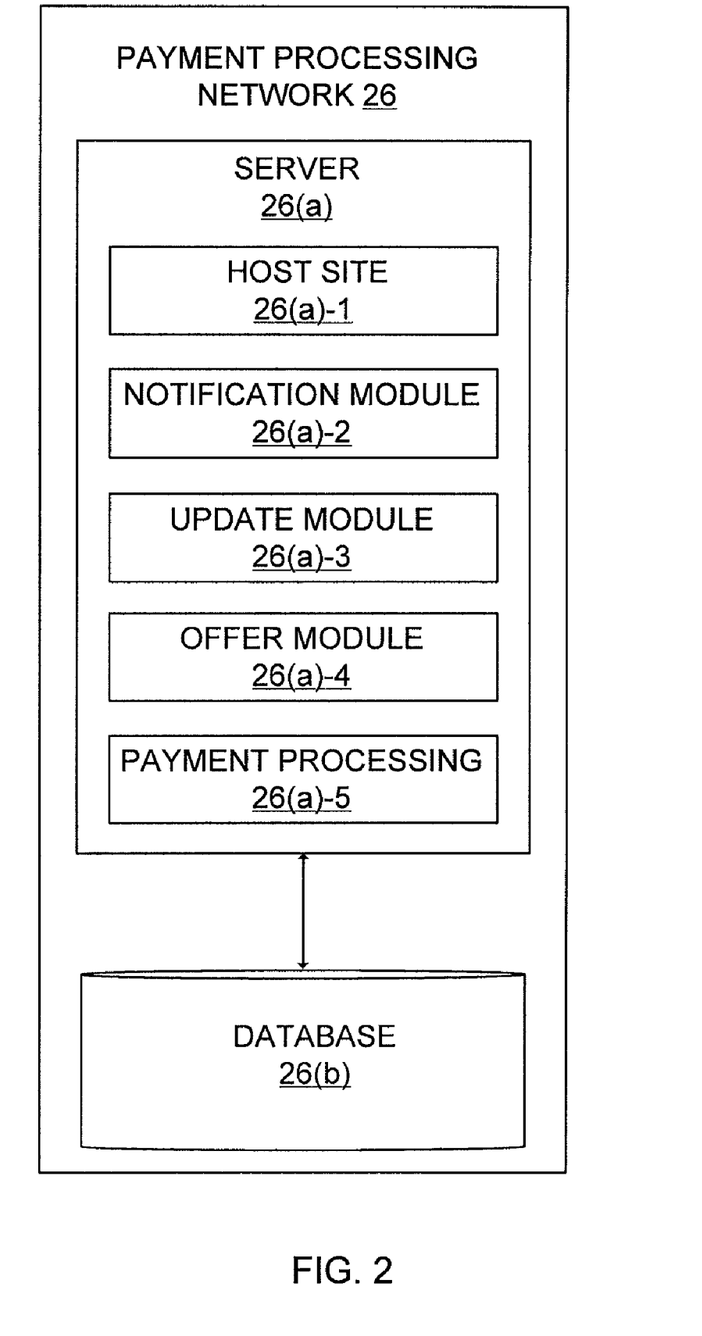
FIG. 2 shows a block diagram of components in a payment processing network.

Referring to FIG. 2, the payment processing network 26 may include a server computer 26(a), and a database 26(b) operatively coupled to the server computer 26(a). A server computer is typically a powerful computer or cluster of computers. For example, the server computer can be a large mainframe, a minicomputer cluster, or a group of servers functioning as a unit. In one example, the server computer may be a database server coupled to a Web server. The payment processing network 26 may use any suitable wired or wireless network, including the Internet.

The server computer 26(a) in the payment processing network 26 may comprise code for causing a processor to implement a method comprising: a) sending a first transaction notification message comprising transaction information comprising an original payee identifier to a user; b) receiving updated transaction information at a central server computer; c) storing the updated transaction information in a database; and d) sending a second transaction notification message using the updated transaction information to the user. The method may also comprise e) sending an offer to the user after receiving the updated payee identifier. In some cases, step e) may be performed before step d).

The database 26(b) may store any suitable type of information. Suitable information that may be stored in the database 26(b) may include original merchant identifiers, suggested merchant identifiers and updated merchant identifiers. Other information that may be included in the database 26(b) may be data that links the original merchant identifiers to updated and/or suggested merchant identifiers. Yet other information that may be included in the database 26(*b*) may include information that updates systematic errors in the system.

The server computer 26(*a*) may also comprise a host site (e.g., a Web site) 26(*a*)-1, and a number of functional modules. The functional modules may comprise a notification module 26(*a*)-2, a merchant update module 26(*a*)-3, an offer module 26(*a*)-4, and a payment processing module 26(*a*)-5. Each of these modules may comprise any suitable combination of hardware and/or software to accomplish the functions described herein.

The Web site 26(*a*)-1 may be used by a user 30 to provide updated information, and may be used to the user 30 to provide merchant feedback, as well as receive merchant responses (e.g., offers or responses to negative comments).

The notification module 26(*a*)-2 may be configured to send transaction notification messages in the form of SMS messages, e-mails and the like to the user. They may be sent, for example, to portable consumer device A 32-1 via the telecommunications network 70 and the telecommunications gateway 60. Alternatively or additionally, they may be sent to consumer device C 32-3 via the Internet 72.

The update module 26(*a*)-3 may be configured to process update information from the user 30 such as updated merchant identifier information. Updated merchant identifiers may be received from the user 30 and may be stored in the database 26(*b*).

The offer module 26(*a*)-4 is configured to provide offers (e.g., coupons) in response to any updates provided by the user 30. For example, it may provide an offer for a merchant 22 after receiving an updated merchant identifier for that merchant 22. The offer may include the updated merchant identifier, and the offer module 26(*a*)-4 may work with the notification module to send the offer to the portable consumer device A 32-1 and/or the consumer device C 32-3. Alternatively or additionally, it may generate offers independent of any updates provided by the user 30.

The payment processing module 26(*a*)-5 may comprise appropriate logic to process electronic payments. For example, the payment processing module 26(*a*)-5 may include an authorization sub-module for receiving and passing authorization request messages to appropriate issuers for approval. It may also include a clearing and settlement sub-module for clearing and settling transactions between different issuers and acquirers.

Referring again to FIG. 1, the merchant 22 may also have, or may receive communications from, an access device 34 that can interact with the portable consumer device 32. The access devices according to embodiments of the invention can be in any suitable form. Examples of access devices include point of sale (POS) devices, cellular phones, PDAs, personal computers (PCs), tablet PCs, handheld specialized readers, set-top boxes, electronic cash registers (ECRs), automated teller machines (ATMs), virtual cash registers (VCRs), kiosks, security systems, access systems, and the like.

If the access device 34 is a point of sale terminal, any suitable point of sale terminal may be used including card readers. The card readers may include any suitable contact or contactless mode of operation. For example, exemplary card readers can include RF (radio frequency) antennas, magnetic stripe readers, etc. to interact with the portable consumer devices 32.

II. Exemplary Methods

Methods according to embodiments of the invention can be described with reference to FIGS. 1-8. Although specific sequences of steps are described, it is understood that embodiments of the invention are not limited to the order of the specific steps described, and that any suitable combination of steps may be included in embodiments of the invention.

Figure 3:
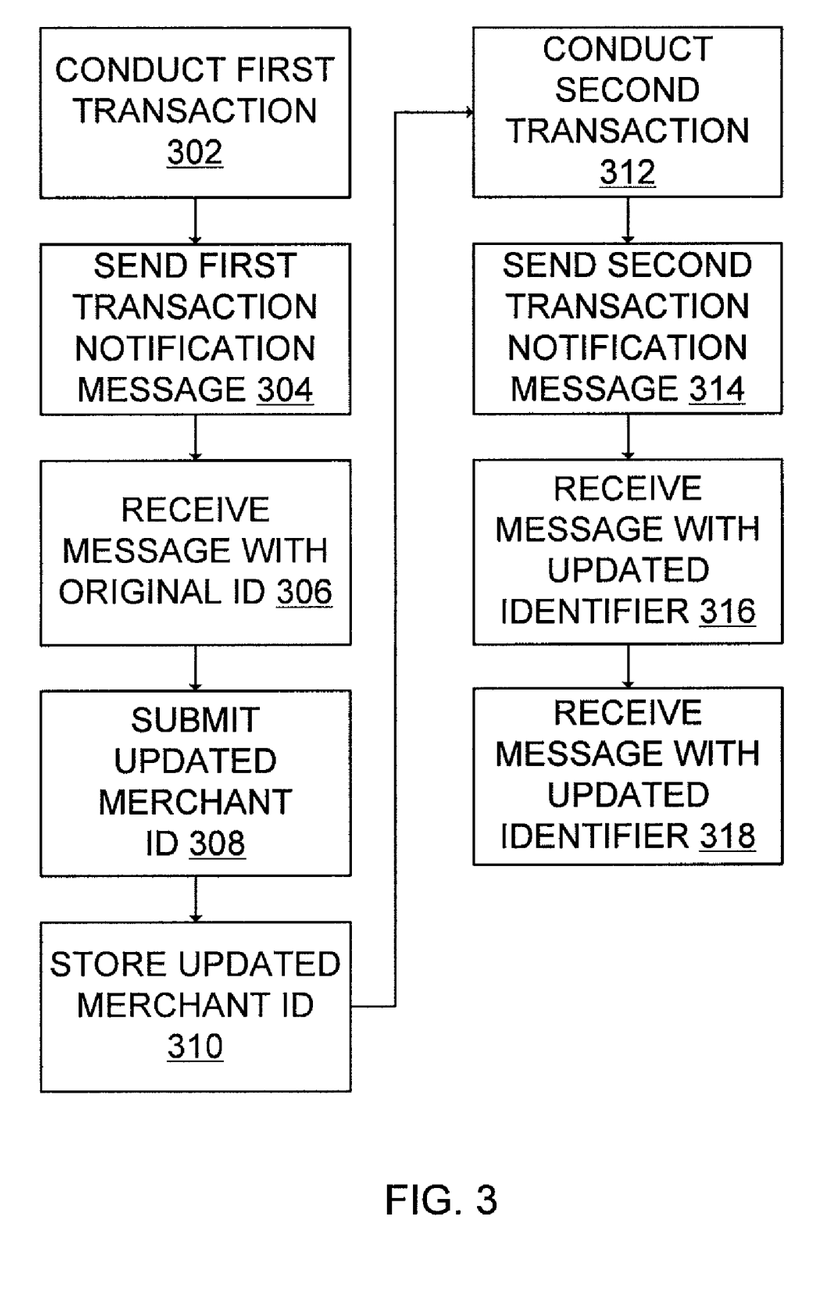
FIG. 3 shows a flowchart illustrating a method according to an embodiment of the invention.

Referring to FIG. 3, in step 302, the user 30 may conduct a transaction with a merchant 22. The transaction may be conducted in person, or may be conducted via the Internet 72, as described above.

In a typical in person purchase transaction, a user 30 purchases a good or service at the merchant 22 using a portable consumer device such as portable consumer device B 32-2, which may be in the form of a credit card. The user's portable consumer device B 32-2 can interact with an access device 34 such as a POS (point of sale) terminal at the merchant 22. For example, the user 30 may take the credit card and may swipe it through an appropriate slot in the POS terminal. Alternatively, the POS terminal may be a contactless reader, and the portable consumer device B 32-2 may be a contactless device such as a contactless card.

An authorization request message is then forwarded to the acquirer 24. After receiving the authorization request message, the authorization request message is then sent to the payment processing network 26. The payment processing network 26 then forwards the authorization request message to the issuer 28 of the portable consumer device B 32-2.

After the issuer 28 receives the authorization request message, the issuer 28 sends an authorization response message back to the payment processing network 26 to indicate whether or not the current transaction is authorized (or not authorized). The transaction processing system 26 (or the server computer located therein) then forwards the authorization response message back to the acquirer 24. The acquirer 24 then sends the response message back to the merchant 22.

After the merchant 22 receives the authorization response message, the access device 34 at the merchant 22 may then provide the authorization response message for the consumer 30. The response message may be displayed by the access device 34, or may be printed out on a receipt.

At the end of the day, a normal clearing and settlement process can be conducted by the transaction processing system 26. A clearing process is a process of exchanging financial details between and acquirer and an issuer to facilitate posting to a consumer's account and reconciliation of the consumer's settlement position. Clearing and settlement can occur simultaneously.

In a typical Internet transaction, the user 30 may use his consumer device C 32-3 and may contact the Web site of the merchant 22 via the Internet 72. The user 30 may select goods for purchase and may enter information onto the Web site including payment card information. As described above, the merchant 22 may then request authorization of the transaction from the issuer 28, and a clearing and settlement process may be performed after the authorization process is performed.

In steps 304 and 306, after the transaction is initiated, a first transaction notification message is sent to the user 30 and is received by the user 30 at any consumer devices 32-1, 32-3 that he may use. The sending and the receipt of the transaction notification message may be substantially contemporaneous with the initiation of the transaction. For example, it may be sent and received by a consumer device within 20 seconds, or 1, 5, or 10 minutes of the initiation of the transaction. The initiation of the transaction may occur when the merchant submits an authorization request message to an issuer for approval.

The transaction notification message may sent by any suitable entity in any suitable manner. In one embodiment, the transaction notification message may be in the form of an electronic message such as an e-mail or SMS message, or a voice response message. For example, referring to FIG. 5, transaction notification message such as "Transaction ID: 789101; A $20 purchase was made at Yummy Brands Store 12345 Using CRD2" may be sent from the payment processing network 26 and to the user's portable consumer device 32-1 via the telecommunications network 70 and the telecommunications gateway 60. In another embodiment, the transaction notification message may be included with a number of other transaction notification messages on periodic account statements (e.g., monthly statements) that are mailed to the user 30.

Figure 5:
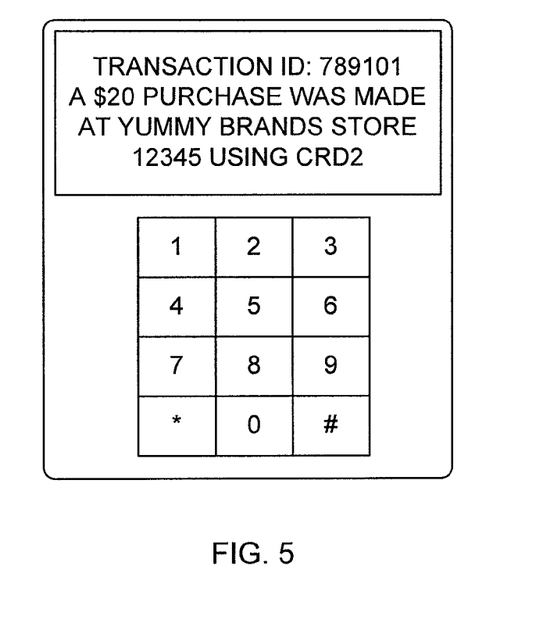
FIG. 5 shows a mobile phone with a first notification message.
Figure 6:
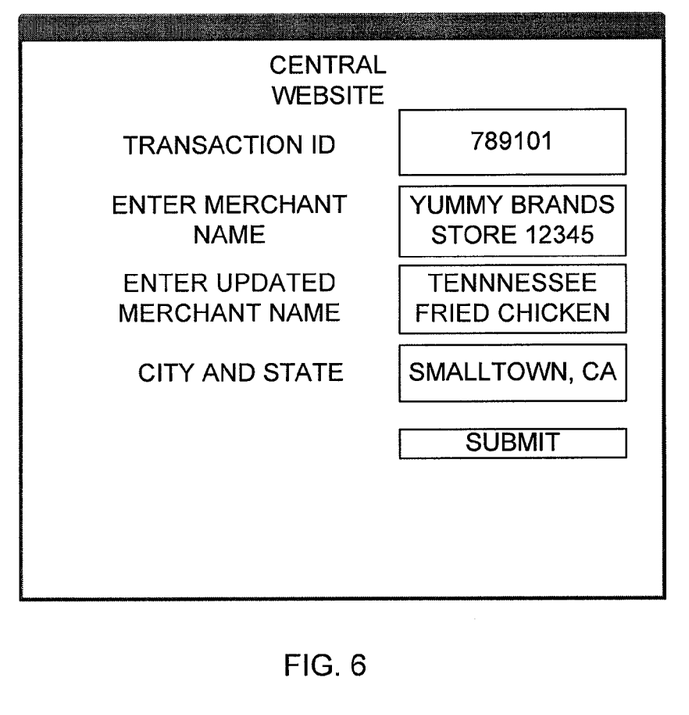
FIG. 6 shows a screenshot of a user interface.

The first transaction notification message may include any suitable data elements. For example, the transaction notification message may include a transaction identifier (e.g., a transaction number), the date of the transaction, the time of the transaction, the amount of the transaction, the type of transaction (e.g., a card not present or a card present type of transaction) an alias for a portable consumer device such as a payment card, and an original merchant identifier. An "original merchant identifier" can be an identifier that was originally created by the merchant, and that has not yet been updated by a user.

After reviewing the transaction notification, the user 30 may determine that the transaction information in the transaction notification needs to be updated. The transaction information may need to be updated for any number of reasons. In one embodiment, the original merchant identifier may not be readily recognizable by the user 30. For example, referring to FIG. 5, the user 30 may not recognize the original merchant identifier "Yummy Brands Store 12345," because "Yummy Brands" is the corporate name and not the tradename of the merchant that the user 30 did business with. Because of the difference in name in the transaction notification message and the tradename of the merchant involved with the transaction, the user 30 may also erroneously contact the issuer 28 to dispute the transaction only to later learn that he did in fact conduct the transaction. At some point in time, the user 30 will determine that the original merchant identifier "Yummy Brands Store 12345" is actually the same merchant as "Tennessee Fried Chicken" in Smalltown, Calif. In other cases, the user may want to customize the name of the merchant so that it is more recognizable to the user, even though the user may recognize the original merchant identifier.

In yet other embodiments, transaction information in a transaction notification may simply be wrong. For example, the name of the merchant, the amount of the transaction, etc. may be incorrect. This may reflect some systematic error that is occurring within the system.

As shown in step 308, the user 30 may submit an updated merchant identifier to the payment processing network 26. This can be done in any number of ways. For example, in some embodiments, the user 30 may use the consumer device A 32-1, consumer device C 32-3, or any other suitable device, and may contact the Web site 26(*a*)-1 run by the server computer 26(*a*) in the payment processing network 26. The user 30 may be presented with a Web page like that shown in FIG. 6, where the user 30 may input the transaction identifier, an updated merchant identifier (e.g., "Tennessee Fried Chicken"), and, optionally, the original merchant identifier (e.g., "Yummy Brands Store 12345"). Alternatively or additionally, the user 30 could select from a predetermined list of possible updated merchant identifiers in a drop down menu or the like. The list of updated identifiers could have been compiled from suggestions from other users, or may have been created by another entity (e.g., merchants, payment processing organizations, issuers, etc.). After clicking the "submit" button or other data entry element, the selection of the updated merchant identifier may be transmitted to the server computer 26(*a*), and the update module 26(*a*)-3 may update the database 26(*b*) with this information.

In other embodiments, the user 30 may provide information other than an updated merchant identifier. For example, if the amount of the transaction is incorrect, then the user may notify a central server of this, using the consumer device that received the original transaction notification message. If many users provide the same or similar response, the central server will be informed that a systematic error is present and that it should be corrected.

At some point in time, as shown in step 312 in FIG. 3, a second transaction is conducted by the user 30 at that same merchant 22. The second transaction may occur in the same or different manner than the first transaction that is described above.

Upon receiving the transaction information in an authorization request message from the merchant 22, using the notification module 26(*a*)-2, the server computer 26(*a*) in the payment processing network 26 can retrieve the updated merchant identifier from the database 26(*b*) and may generate a transaction notification message with the updated merchant identifier, the transaction amount, payment device identifier (e.g., a card alias), the current time and/or date, etc.

Figure 7:
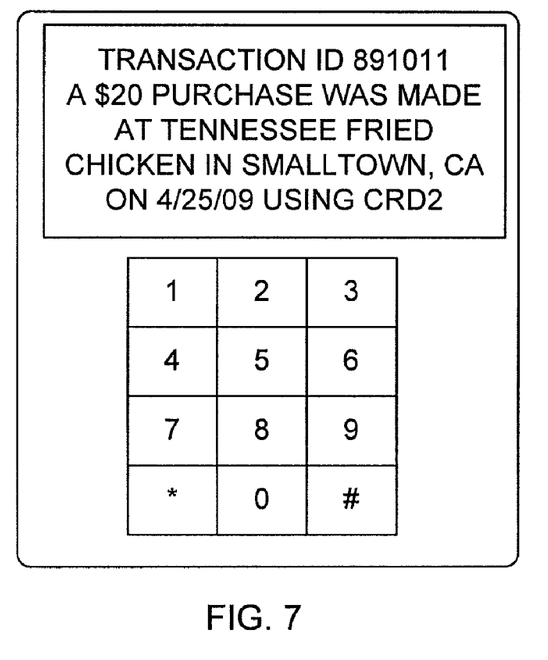
FIG. 7 shows a mobile phone with a second notification message.

Then, in step 314, a second transaction notification message comprising the updated merchant identifier (e.g., "Tennessee Fried Chicken") is then sent to the user 30, and is thereafter received by the user 30 (step 318). For example, a transaction message with the updated merchant identifier is shown in FIG. 7. The second notification message could be received at any of the consumer devices 32-1, 32-2, 32-3. The sending and the receipt of the transaction notification message may be substantially contemporaneous with the initiation of the transaction. For example, it may be sent and received by a consumer device within 20 seconds, or 1, 5, or 10 minutes of the initiation of the transaction. The initiation of the transaction may occur when the merchant submits an authorization request message to an issuer for approval.

As illustrated in embodiments described with respect to FIG. 3, a transaction notification message including an updated merchant identifier may be provided to the user 30. The updated merchant identifier is immediately recognizable to the user 30, and the user 30 is not likely to assume that the transaction is not one that he conducted.

Other embodiments of the invention can relate to validation mechanisms. Data validation mechanisms can include offers that validate that the user recognizes the updated merchant identifier or any other type of updated data. Such offers not only validate changes in the system, but can also drive business back to merchants and can help appease the user 30 if the user provided negative comments about the merchant 22 or other entity after receiving an erroneous notification message.

Figure 4:
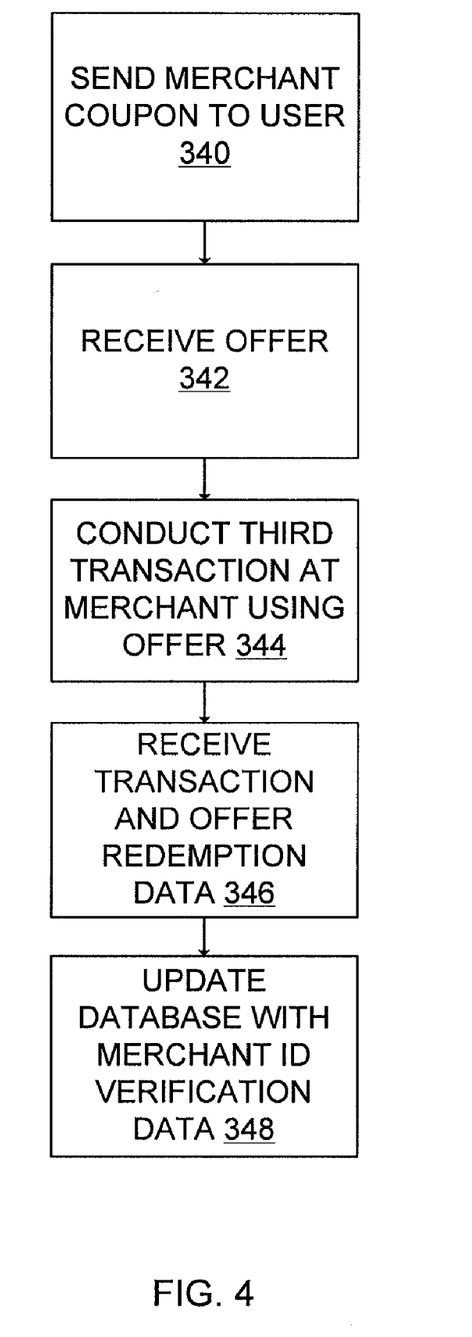
FIG. 4 shows a flowchart illustrating a method according to another embodiment of the invention.
Figure 8:
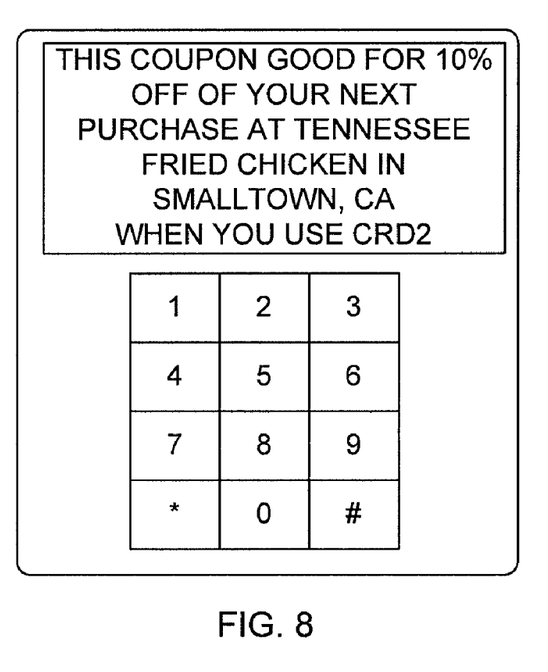
FIG. 8 shows a mobile phone with a message comprising an offer.

With reference to steps 340 and 342 in the flowchart in FIG. 4, in some embodiments, after providing updated information about a particular merchant, using the offer module 26(*a*)-4, the server computer 26(*a*) in the payment processing network 26 (or other entity such as the issuer 28) may send an offer to the user 30, and the user 30 may receive the offer. The offer may contain the updated merchant identifier, and may provide for a discount on the next purchase conducted by the user 30 at that merchant 22. For example, FIG. 8 shows a coupon that is sent to the user's portable consumer device 32-1 indicating that a discount can be received at the merchant 22.

In step 346, the user 30 can conduct a third transaction at the merchant 22 and may redeem the coupon at the merchant 22. The third transaction may be conducted in the same or different manner than the first and second transactions that are described above. During the transaction, offer redemption data and third transaction data (e.g., data such as the transaction amount, merchant ID, and account number) can then be transmitted from the merchant 22 and received at the payment processing network 26. The offer redemption data may indicate that the user 30 intends to redeem the offer. Using the coupon module 26(*a*)-4 and the payment processing module 26(*a*)-5, the server computer 26 can provide apply the discount to the current purchase, and can generate a subsequent authorization request message with the updated transaction amount and may send it to the issuer 28 for approval.

In some embodiments, the notification module 26(*a*)-2 can then send a third transaction notification message back to any of the consumer devices (e.g., 32-1 or 32-3). The transaction notification message may contain the updated merchant identifier, an indication that the offer was redeemed, the original purchase price, and the amount of the discount applied.

In step 348, the server computer 26(*a*) can update the database 26(*b*) to indicate that the new merchant identifier is correct and that the consumer validated the new merchant identifier by using the offer with the new merchant identifier. Since the database 26(*b*) is updated, any subsequent transaction notification messages for the user 30 or other users may have a more user friendly description of the merchant.

III. Exemplary Computer Apparatuses and Consumer Devices

Figure 9:
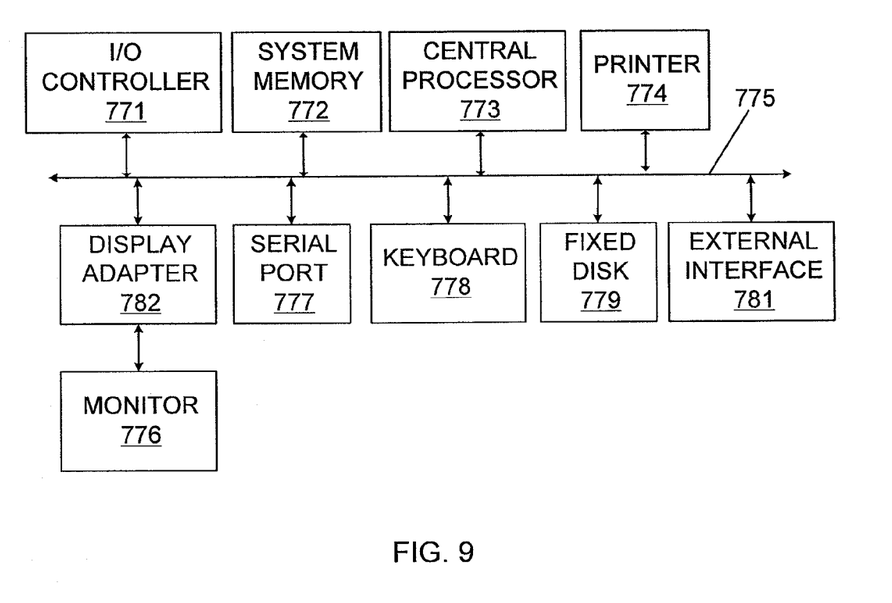
FIG. 9 shows a block diagram of a computer apparatus.

The various participants and elements in FIG. 1 may operate one or more computer apparatuses (e.g., a server computer) to facilitate the functions described herein. Any of the elements in FIG. 1 may use any suitable number of subsystems to facilitate the functions described herein. Examples of such subsystems or components are shown in FIG. 9. The subsystems shown in FIG. 9 are interconnected via a system bus 775. Additional subsystems such as a printer 774, keyboard 778, fixed disk 779 (or other memory comprising computer readable media), monitor 776, which is coupled to display adapter 782, and others are shown. Peripherals and input/output (I/O) devices, which couple to I/O controller 771, can be connected to the computer system by any number of means known in the art, such as serial port 777. For example, serial port 777 or external interface 781 can be used to connect the computer apparatus to a wide area network such as the Internet, a mouse input device, or a scanner. The interconnection via system bus allows the central processor 773 to communicate with each subsystem and to control the execution of instructions from system memory 772 or the fixed disk 779, as well as the exchange of information between subsystems. The system memory 772 and/or the fixed disk 779 may embody a computer readable medium.

Figure 10:
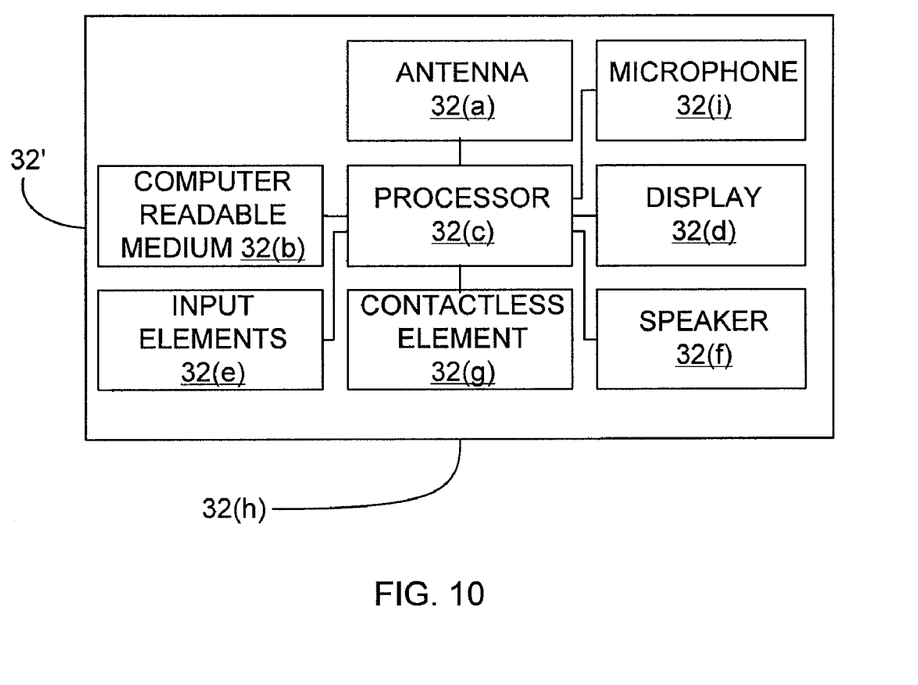
FIG. 10 shows a block diagram of components in a mobile phone.

FIG. 10 shows a block diagram of another phone 32' that can be used in embodiments of the invention. The exemplary wireless phone 32' may comprise a computer readable medium and a body as shown in FIG. 10. The computer readable medium 32(*b*) may be present within the body 32(*h*), or may be detachable from it. The body 32(*h*) may be in the form a plastic substrate, housing, or other structure. The computer readable medium 32(*b*) may be in the form of (or may be included in) a memory that stores data (e.g., data relating to issuer specific payment services) and may be in any suitable form including a magnetic stripe, a memory chip, etc. The memory preferably stores information such as financial information, transit information (e.g., as in a subway or train pass), access information (e.g., as in access badges), etc. Financial information may include information such as bank account information, a bank identification number (BIN), credit or debit card number information, account balance information, expiration date, user information such as name, date of birth, etc. Any of this information may be transmitted by the phone 32'.

In some embodiments, information in the memory may also be in the form of data tracks that are traditionally associated with credits cards. Such tracks include Track 1 and Track 2. Track 1 ("International Air Transport Association") stores more information than Track 2, and contains the cardholder's name as well as account number and other discretionary data. This track is sometimes used by the airlines when securing reservations with a credit card. Track 2 ("American Banking Association") is currently most commonly used. This is the track that is read by ATMs and credit card checkers. The ABA (American Banking Association) designed the specifications of this track and all world banks must abide by it. It contains the cardholder's account, encrypted PIN, plus other discretionary data.

The phone 32' may further include a contactless element 32(*g*), which is typically implemented in the form of a semiconductor chip (or other data storage element) with an associated wireless transfer (e.g., data transmission) element, such as an antenna. Contactless element 32(*g*) is associated with (e.g., embedded within) phone 32 and data or control instructions transmitted via a cellular network may be applied to contactless element 32(*g*) by means of a contactless element interface (not shown). The contactless element interface functions to permit the exchange of data and/or control instructions between the mobile device circuitry (and hence the cellular network) and an optional contactless element 32(*g*).

Contactless element 32(*g*) is capable of transferring and receiving data using a near field communications ("NFC") capability (or near field communications medium) typically in accordance with a standardized protocol or data transfer mechanism (e.g., ISO 14443/NFC). Near field communications capability is a short-range communications capability, such as RFID, Bluetooth™, infra-red, or other data transfer capability that can be used to exchange data between the phone 32' and an interrogation device. Thus, the phone 32' is capable of communicating and transferring data and/or control instructions via both cellular network and near field communications capability.

The phone 32' may also include a processor 32(*c*) (e.g., a microprocessor) for processing the functions of the phone 32 and a display 32(*d*) to allow a user to see phone numbers and other information and messages. The phone 32' may further include input elements 32(*e*) to allow a user to input information into the device, a speaker 32(*f*) to allow the user to hear voice communication, music, etc., and a microphone 32(*i*) to allow the user to transmit her voice through the phone 32'. The phone 32' may also include an antenna 32(*a*) for wireless data transfer (e.g., data transmission).

Figure 11:
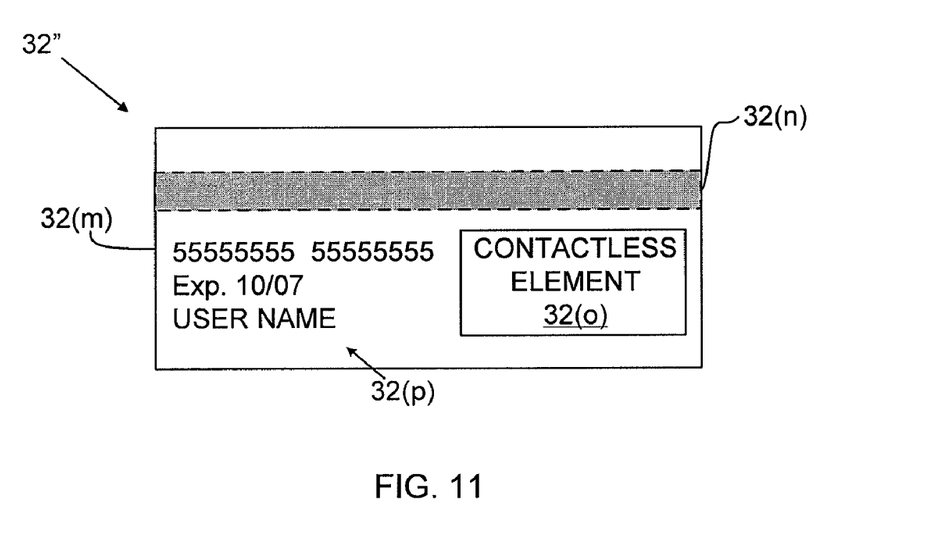
FIG. 11 shows an illustration of a card.

An example of a portable consumer device 32" in the form of a card is shown in FIG. 11. FIG. 11 shows a plastic substrate 32(*m*). A contactless element 32(*o*) for interfacing with an access device 34 may be present on or embedded within the plastic substrate 32(*m*). User information 32(*p*) such as an account number, expiration date, and user name may be printed or embossed on the card. Further, a magnetic stripe 32(*n*) may also be on the plastic substrate 32(*m*). The portable consumer device 32" may also comprise a microprocessor and/or memory chips with user data stored in them.

As shown in FIG. 11, the portable consumer device 32" may include both a magnetic stripe 32(*n*) and a contactless element 32(*o*). In other embodiments, both the magnetic stripe 32(*n*) and the contactless element 32(*o*) may be in the portable consumer device 32". In other embodiments, either the magnetic stripe 32(n) or the contactless element 32(o) may be present in the portable consumer device 32".

Embodiments of the invention have a number of advantages. First, many users can help update and/or "clean" merchant data in a payment system. This provides for more accurate transaction processing and fewer inquiries regarding potentially fraudulent transactions. Second, by providing updated merchant identifiers, users can provide labels for the merchants that are conducting the transactions with the users. Transaction messages can subsequently be easily recognized by the users therefore providing for better user experiences. Third, without knowing that they are doing so, users can help "clean" data in a payment system so that the data provided to them is accurate. Fourth, in some embodiments, the Web site that the user contacts can be used as both a portal to provide feedback on notification message errors and/or corrections, as well as a site for providing feedback to and receiving responses from merchants. Fifth, in some embodiments, offers can be provided to users after they provide updated information to the system (e.g., to correct errors in the notification messages or to provide updated identifiers). Such offers can drive business back to the merchants and can also help appease users that may have had a negative experience due to a notification message that was incorrect or due to a bad merchant experience.

Embodiments of the invention are not limited to the above-described embodiments. For example, although separate functional blocks are shown for an issuer, payment processing network, and acquirer, some entities perform all of these functions and may be included in embodiments of invention.

It should be understood that the present invention as described above can be implemented in the form of control logic using computer software in a modular or integrated manner. Based on the disclosure and teachings provided herein, a person of ordinary skill in the art will know and appreciate other ways and/or methods to implement the present invention using hardware and a combination of hardware and software Any of the software components or functions described in this application, may be implemented as software code to be executed by a processor using any suitable computer language such as, for example, Java, C++ or Perl using, for example, conventional or object-oriented techniques. The software code may be stored as a series of instructions, or commands on a computer readable medium, such as a random access memory (RAM), a read only memory (ROM), a magnetic medium such as a hard-drive or a floppy disk, or an optical medium such as a CD-ROM. Any such computer readable medium may reside on or within a single computational apparatus, and may be present on or within different computational apparatuses within a system or network.

The above description is illustrative and is not restrictive. Many variations of the invention will become apparent to those skilled in the art upon review of the disclosure. The scope of the invention should, therefore, be determined not with reference to the above description, but instead should be determined with reference to the pending claims along with their full scope or equivalents.

One or more features from any embodiment may be combined with one or more features of any other embodiment without departing from the scope of the invention.

A recitation of "a", "an" or "the" is intended to mean "one or more" unless specifically indicated to the contrary.

All patents, patent applications, publications, and descriptions mentioned above are herein incorporated by reference in their entirety for all purposes. None is admitted to be prior art.

The invention claimed is:

1. A method comprising:
    a) sending a first transaction notification message comprising first transaction information comprising an original payee identifier to a first portable consumer device operated by a first user within 5 minutes of an initiation of a first transaction;
    b) receiving, from the first user, updated transaction information comprising an updated payee identifier at a central server computer;
    c) storing the updated transaction information in a database; and
    d) sending a second transaction notification message using the updated transaction information to the first portable consumer device operated by the first user within 5 minutes after an initiation of a second transaction,
    wherein receiving the updated transaction information comprises receiving an updated merchant identifier, wherein the original payee identifier is an original merchant identifier and wherein the updated payee identifier is an updated merchant identifier, and
    wherein a), c), and d) are performed by the central server computer, and wherein the original merchant identifier and the updated merchant identifier are associated with the same merchant, wherein the method further comprises
    receiving by the central server computer, subsequent transaction information for a subsequent transaction conducted by a second user; and
    responsive to receiving the subsequent transaction information, sending a subsequent transaction notification message comprising the updated transaction information to a second portable consumer device operated by the second user within 5 minutes after an initiation of a subsequent transaction conducted by the second user.

2. The method of claim 1 further comprising providing a list of possible merchant identifiers to the first user, wherein the list of possible merchant identifiers includes the updated merchant identifier.

3. The method of claim 1 wherein the method further comprises:
    e) sending an offer to the first user after receiving the updated payee identifier.

4. The method of claim 3 wherein e) is performed before d).

5. The method of claim 3 wherein the method further comprises:
    f) receiving offer redemption data from the merchant, wherein the offer redemption data indicates that the first user intends to redeem the offer.

6. The method of claim 5 further comprising sending a third transaction notification message comprising the updated merchant identifier, an indication that the offer was redeemed, an original purchase price, and an amount of a discount applied.

7. The method of claim 1 wherein the first transaction notification message is sent to the first user in response to the first transaction initiated by the first user, wherein the first transaction includes receiving an authorization request message at the central server computer from the merchant via an acquirer, sending the authorization request message to an issuer, receiving an authorization response message from the issuer, and sending the authorization response message to the merchant.

8. The method of claim 7 wherein the first transaction is conducted using a debit card or credit card associated with the first user.

9. The method of claim 1 wherein the first and second portable consumer devices are mobile phones, and wherein the first transaction notification message and the second transaction notification message comprise an alias for a payment card.

10. A computer readable medium comprising computer readable program code embodied therein, the computer readable program code executed by a processor to implement a method comprising:
   a) sending a first transaction notification message comprising first transaction information comprising an original payee identifier to a first portable consumer device operated by a first user within 5 minutes after an initiation of a first transaction;
   b) receiving, from the first user, updated transaction information comprising an updated payee identifier at a central server computer;
   c) storing the updated transaction information in a database; and
   d) sending a second transaction notification message using the updated transaction information to the first portable consumer device operated by the first user within 5 minutes after an initiation of a second transaction,
   wherein receiving the updated transaction information comprises receiving an updated merchant identifier, and wherein the original payee identifier is an original merchant identifier and wherein the updated payee identifier is an updated merchant identifier,
   wherein a), c), and d) are performed by the central server computer, and wherein the original merchant identifier and the updated merchant identifier are associated with the same merchant, wherein the method further comprises
   receiving by the server computer, subsequent transaction information for a subsequent transaction conducted by a second user; and
   responsive to receiving the subsequent transaction information, sending a subsequent transaction notification message comprising the updated transaction information to a second portable consumer device operated by the second user within 5 minutes after an initiation of a subsequent transaction conducted by the second user.

11. The computer readable medium of claim 10 wherein the method further comprises providing a list of possible merchant identifiers to the first user, wherein the list of possible merchant identifiers includes the updated merchant identifier.

12. The computer readable medium of claim 11 wherein the method further comprises sending an offer to the first user after receiving the updated payee identifier.

13. The computer readable medium of claim 10 wherein the method further comprises:
   e) sending an offer to the first user after receiving the updated payee identifier.

14. The computer readable medium of claim 13 wherein the method further comprises:
   f) receiving offer redemption data from the merchant, wherein the offer redemption data indicates that the first user intends to redeem the offer.

15. A system comprising:
   a server computer comprising: (i) a processor, and (ii) a computer readable medium coupled to the processor, the computer readable medium comprising code executable by the processor to execute a method comprising a) sending a first transaction notification message comprising first transaction information comprising an original payee identifier to a first portable consumer device operated by a first user within 5 minutes after an initiation of a first transaction, b) receiving, from the first user, updated transaction information including an updated payee identifier at a central server computer, c) storing the updated transaction information in a database, and d) sending a second transaction notification message using the updated transaction information to a portable consumer device operated by the first user within 5 minutes after an initiation of a second transaction, wherein receiving the updated transaction information comprises receiving an updated merchant identifier, and wherein the original payee identifier is an original merchant identifier and wherein the updated payee identifier is an updated merchant identifier, wherein a), c), and d) are performed by the central server computer, and wherein the original merchant identifier and the updated merchant identifier are associated with the same merchant, wherein the method further comprises receiving by the central server computer, subsequent transaction information for a subsequent transaction conducted by a second user; and responsive to receiving the subsequent transaction information, sending a subsequent transaction notification message comprising the updated transaction information to a second portable consumer device operated by the second user within 5 minutes after an initiation of a subsequent transaction conducted by the second user; and
   a database operatively coupled to the server computer.

16. The system of claim 15 wherein the method further comprises providing a list of possible merchant identifiers to the first user, wherein the list of possible merchant identifiers includes the updated merchant identifier.

17. The system of claim 16 wherein the method further comprises sending an offer to the first user after receiving the updated payee identifier.

18. The system of claim 15 wherein the method further comprises:
   e) sending an offer to the first user after receiving the updated payee identifier.

19. The system of claim 18 wherein the method further comprises:
   f) receiving offer redemption data from the merchant, wherein the offer redemption data indicates that the first user intends to redeem the offer.

* * * * *

UNITED STATES PATENT AND TRADEMARK OFFICE
CERTIFICATE OF CORRECTION

PATENT NO.        : 7,668,785 B1                                    Page 1 of 1
APPLICATION NO.   : 12/568065
DATED             : February 23, 2010
INVENTOR(S)       : Ayman Hammad It is certified that error appears in the above-identified patent and that said Letters Patent is hereby corrected as shown below:

In claim 1, line 21, please delete "an" and insert --the--.

In claim 10, line 27, please delete "an" and insert --the--.

In claim 15, line 24, please delete "an" and insert --the--.

Signed and Sealed this

Twenty-fifth Day of May, 2010

David J. Kappos
*Director of the United States Patent and Trademark Office*

UNITED STATES PATENT AND TRADEMARK OFFICE
CERTIFICATE OF CORRECTION

| | | |
|---|---|---|
| PATENT NO. | : 7,668,785 B1 | Page 1 of 1 |
| APPLICATION NO. | : 12/568065 | |
| DATED | : February 23, 2010 | |
| INVENTOR(S) | : Ayman Hammad | |

It is certified that error appears in the above-identified patent and that said Letters Patent is hereby corrected as shown below:

Column 12, In claim 1, line 21, please delete "an" and insert --the--.

Column 13, In claim 10, line 27, please delete "an" and insert --the--.

Column 14, In claim 15, line 24, please delete "an" and insert --the--.

This certificate supersedes the Certificate of Correction issued May 25, 2010.

Signed and Sealed this

Twenty-second Day of June, 2010

David J. Kappos
*Director of the United States Patent and Trademark Office*